(12) United States Patent
Murata

(10) Patent No.: US 7,444,279 B2
(45) Date of Patent: Oct. 28, 2008

(54) QUESTION ANSWERING SYSTEM AND QUESTION ANSWERING PROCESSING METHOD

(75) Inventor: Masaki Murata, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 705 days.

(21) Appl. No.: 10/859,293

(22) Filed: Jun. 3, 2004

(65) Prior Publication Data

US 2005/0086045 A1 Apr. 21, 2005

(30) Foreign Application Priority Data

Oct. 17, 2003 (JP) ............................. 2003-357789

(51) Int. Cl.
*G06F 17/27* (2006.01)
(52) U.S. Cl. ........................................................ 704/9
(58) Field of Classification Search ................. 704/9
See application file for complete search history.

(56) References Cited

U.S. PATENT DOCUMENTS

| 5,384,894 | A | * | 1/1995 | Vassiliadis et al. ............ 706/52 |
| 5,519,608 | A | * | 5/1996 | Kupiec ............................ 704/9 |
| 7,209,876 | B2 | * | 4/2007 | Miller et al. ................... 704/9 |
| 7,269,545 | B2 | * | 9/2007 | Agichtein et al. .............. 704/9 |
| 2003/0163302 | A1 | * | 8/2003 | Yin ................................ 704/9 |

OTHER PUBLICATIONS

Dumais et al., "Web question answering: is more always better?", Proceedings of the 25th annual international ACM SIGIR conference on Research and development in information retrieval, pp. 291-298, 2002.*

Clarke et al., "Web reinforced question answering", In Proceedings of the Tenth Text REtrieval Conference (TREC 2001).*

Toru Takaki et al., "NTT Data Question-Answering Experiment at the NTCIR-3 QAC", National Institute of Informatics, The NTCIR Workshop 3 Meeting, ($3^{rd}$ NTCIR workshop meeting), Oct. 2002, pp. 95-100.

Eisaku Maeda, "Question Answering Viewed from Pattern Recognition/Statistical Learning", Natural Language Understanding and Methods of Communication, seminar material, Institute of Electronics, Information and Communication Engineers, Natural Language Understanding and Methods of Communication (NLC), Jan. 27, 2003, pp. 29-64.

Masaki Murata et al., "A Question-Answering System Using Unit Estimation and Probabilistic Near-Terms IR", National Institute of Infiormatics, NTCIR Workshop 3 Meeting($3^{rd}$ NTCIR workshop meeting), Oct. 8-10, 2002, pp. 47-54.

* cited by examiner

*Primary Examiner*—David R. Hudspeth
*Assistant Examiner*—Brian L Albertalli

(57) ABSTRACT

A question answering system estimates an answer type of an answer from a input question statement, extracts keywords from the question statement and retrieves a document database, extracts language expressions (answer candidates) from the extracted document data, assigns evaluation points thereto. When there are a plurality of answer candidates having the same language expression, the system sorts those evaluation points in descending ranking order of evaluation, calculates values of evaluation points using such weighting that the value to be processed for each evaluation point diminishes, regards the sum total of those values as the evaluation point of the answer candidate, and outputs the answer candidate whose counted evaluation point is equal to or greater than a predetermined evaluation as an answer.

8 Claims, 7 Drawing Sheets

|  | Task1 | Task2 |
|---|---|---|
| 1st EXAMPLE: | 0.524 | 0.364 |
| 2nd EXAMPLE: | 0.437 | 0.302 |
| 3rd EXAMPLE: b=0.01 | 0.544 | 0.379 |
| b=0.02 | 0.551 | 0.384 |
| b=0.05 | 0.549 | 0.380 |
| b=0.1 | 0.561 | 0.404 |
| b=0.2 | 0.573 | 0.426 |
| b=0.3 | 0.579 | 0.430 |
| b=0.4 | 0.590 | 0.440 |
| b=0.5 | 0.579 | 0.439 |
| b=0.6 | 0.571 | 0.428 |
| b=0.7 | 0.569 | 0.426 |
| b=0.8 | 0.568 | 0.424 |
| b=0.9 | 0.569 | 0.428 |
| b=1 | 0.565 | 0.428 |
| b=1.1 | 0.561 | 0.418 |
| b=1.2 | 0.559 | 0.418 |
| b=1.3 | 0.553 | 0.408 |
| b=1.4 | 0.551 | 0.408 |
| b=1.5 | 0.545 | 0.399 |
| b=2 | 0.546 | 0.409 |
| b=5 | 0.488 | 0.349 |
| b=10 | 0.468 | 0.331 |
| b=100 | 0.442 | 0.307 |
| b=1000 | 0.438 | 0.302 |
| 4th EXAMPLE: k=0.9 | 0.464 | 0.331 |
| k=0.8 | 0.483 | 0.341 |
| k=0.7 | 0.530 | 0.394 |
| k=0.6 | 0.535 | 0.391 |
| k=0.5 | 0.552 | 0.406 |
| k=0.4 | 0.572 | 0.416 |
| k=0.3 | 0.592 | 0.446 |
| k=0.2 | 0.584 | 0.441 |
| k=0.1 | 0.560 | 0.409 |
| k=0.05 | 0.554 | 0.392 |
| k=0.02 | 0.549 | 0.386 |
| k=0.01 | 0.540 | 0.374 |
| k=0.005 | 0.541 | 0.374 |
| k=0.002 | 0.539 | 0.374 |
| k=0.001 | 0.538 | 0.374 |
| k=0.0001 | 0.538 | 0.374 |

FIG.3

|  | Task1 | Task2 |
|---|---|---|
| 1st EXAMPLE: | 0.130 | 0.065 |
| 2nd EXAMPLE: | 0.051 | 0.038 |
| 3rd EXAMPLE: b=0.01 | 0.118 | 0.065 |
| b=0.02 | 0.119 | 0.064 |
| b=0.05 | 0.109 | 0.056 |
| b=0.1 | 0.109 | 0.056 |
| b=0.2 | 0.114 | 0.054 |
| b=0.3 | 0.102 | 0.046 |
| b=0.4 | 0.092 | 0.039 |
| b=0.5 | 0.089 | 0.034 |
| b=0.6 | 0.081 | 0.029 |
| b=0.7 | 0.083 | 0.029 |
| b=0.8 | 0.089 | 0.038 |
| b=0.9 | 0.086 | 0.038 |
| b=1 | 0.089 | 0.043 |
| b=1.1 | 0.089 | 0.043 |
| b=1.2 | 0.089 | 0.043 |
| b=1.3 | 0.086 | 0.038 |
| b=1.4 | 0.083 | 0.038 |
| b=1.5 | 0.077 | 0.033 |
| b=2 | 0.077 | 0.033 |
| b=5 | 0.059 | 0.036 |
| b=10 | 0.054 | 0.036 |
| 4th EXAMPLE: k=0.9 | 0.062 | 0.042 |
| k=0.8 | 0.072 | 0.035 |
| k=0.7 | 0.081 | 0.033 |
| k=0.6 | 0.100 | 0.049 |
| k=0.5 | 0.101 | 0.039 |
| k=0.4 | 0.111 | 0.044 |
| k=0.3 | 0.130 | 0.066 |
| k=0.2 | 0.129 | 0.066 |
| k=0.1 | 0.109 | 0.051 |
| k=0.05 | 0.115 | 0.059 |
| k=0.02 | 0.115 | 0.064 |
| k=0.01 | 0.115 | 0.060 |

FIG.4

|  | Task1 | Task2 |
|---|---|---|
| 1st EXAMPLE: | 0.279 | 0.155 |
| 2nd EXAMPLE: | 0.373 | 0.260 |
| 3rd EXAMPLE: b=0.01 | 0.429 | 0.303 |
| b=0.02 | 0.428 | 0.303 |
| b=0.05 | 0.428 | 0.303 |
| b=0.1 | 0.431 | 0.303 |
| b=0.2 | 0.433 | 0.303 |
| b=0.3 | 0.429 | 0.300 |
| b=0.4 | 0.433 | 0.302 |
| b=0.5 | 0.429 | 0.297 |
| b=0.6 | 0.425 | 0.297 |
| b=0.7 | 0.425 | 0.297 |
| b=0.8 | 0.423 | 0.297 |
| b=0.9 | 0.421 | 0.297 |
| b=1 | 0.420 | 0.294 |
| b=1.1 | 0.422 | 0.294 |
| b=1.2 | 0.419 | 0.289 |
| b=1.3 | 0.418 | 0.289 |
| b=1.4 | 0.420 | 0.294 |
| b=1.5 | 0.416 | 0.289 |
| b=2 | 0.422 | 0.297 |
| b=5 | 0.396 | 0.275 |
| b=10 | 0.383 | 0.265 |
| 4th EXAMPLE: k=0.9 | 0.377 | 0.260 |
| k=0.8 | 0.387 | 0.268 |
| k=0.7 | 0.402 | 0.277 |
| k=0.6 | 0.405 | 0.282 |
| k=0.5 | 0.420 | 0.292 |
| k=0.4 | 0.422 | 0.292 |
| k=0.3 | 0.434 | 0.301 |
| k=0.2 | 0.431 | 0.304 |
| k=0.1 | 0.427 | 0.294 |
| k=0.05 | 0.420 | 0.279 |
| k=0.02 | 0.411 | 0.270 |
| k=0.01 | 0.412 | 0.270 |

FIG.5

|  | Task1 | Task2 |
|---|---|---|
| 1st EXAMPLE: sys301 | 0.389 | 0.245 |
| 2nd EXAMPLE: sys302 | 0.457 | 0.312 |
| 3rd EXAMPLE: b=0.01 | 0.489 | 0.356 |
| b=0.02 | 0.490 | 0.356 |
| b=0.05 | 0.495 | 0.356 |
| b=0.1 | 0.496 | 0.356 |
| b=0.2 | 0.501 | 0.361 |
| b=0.3 | 0.498 | 0.358 |
| b=0.4 | 0.504 | 0.363 |
| b=0.5 | 0.502 | 0.363 |
| b=0.6 | 0.502 | 0.363 |
| b=0.7 | 0.498 | 0.365 |
| b=0.8 | 0.494 | 0.360 |
| b=0.9 | 0.494 | 0.360 |
| b=1 | 0.492 | 0.355 |
| b=1.1 | 0.497 | 0.360 |
| b=1.2 | 0.498 | 0.360 |
| b=1.3 | 0.496 | 0.360 |
| b=1.4 | 0.495 | 0.360 |
| b=1.5 | 0.495 | 0.360 |
| b=2 | 0.490 | 0.355 |
| b=5 | 0.473 | 0.338 |
| b=10 | 0.469 | 0.333 |
| 4th EXAMPLE: k=0.9 | 0.463 | 0.327 |
| k=0.8 | 0.470 | 0.333 |
| k=0.7 | 0.479 | 0.345 |
| k=0.6 | 0.486 | 0.355 |
| k=0.5 | 0.490 | 0.355 |
| k=0.4 | 0.488 | 0.350 |
| k=0.3 | 0.488 | 0.345 |
| k=0.2 | 0.494 | 0.349 |
| k=0.1 | 0.497 | 0.353 |
| k=0.05 | 0.496 | 0.358 |
| k=0.02 | 0.494 | 0.358 |
| k=0.01 | 0.488 | 0.353 |

FIG.6

|  | Task1 | Task2 |
|---|---|---|
| 1st EXAMPLE: | 0.513 | 0.355 |
| 2nd EXAMPLE: | 0.512 | 0.356 |
| 3rd EXAMPLE: b=0.01 | 0.531 | 0.373 |
| b=0.02 | 0.539 | 0.383 |
| b=0.05 | 0.545 | 0.390 |
| b=0.1 | 0.540 | 0.390 |
| b=0.2 | 0.556 | 0.414 |
| b=0.3 | 0.563 | 0.425 |
| b=0.4 | 0.559 | 0.420 |
| b=0.5 | 0.558 | 0.422 |
| b=0.6 | 0.562 | 0.422 |
| b=0.7 | 0.556 | 0.417 |
| b=0.8 | 0.555 | 0.417 |
| b=0.9 | 0.558 | 0.422 |
| b=1 | 0.559 | 0.426 |
| b=1.1 | 0.561 | 0.423 |
| b=1.2 | 0.561 | 0.423 |
| b=1.3 | 0.560 | 0.423 |
| b=1.4 | 0.553 | 0.421 |
| b=1.5 | 0.550 | 0.416 |
| b=2 | 0.533 | 0.387 |
| b=5 | 0.517 | 0.365 |
| b=10 | 0.516 | 0.365 |
| 4th EXAMPLE: k=0.9 | 0.516 | 0.365 |
| k=0.8 | 0.516 | 0.365 |
| k=0.7 | 0.522 | 0.375 |
| k=0.6 | 0.535 | 0.392 |
| k=0.5 | 0.551 | 0.416 |
| k=0.4 | 0.554 | 0.412 |
| k=0.3 | 0.557 | 0.417 |
| k=0.2 | 0.559 | 0.420 |
| k=0.1 | 0.543 | 0.392 |
| k=0.05 | 0.536 | 0.385 |
| k=0.02 | 0.537 | 0.378 |
| k=0.01 | 0.531 | 0.371 |

FIG.7

QUESTION ANSWERING SYSTEM AND QUESTION ANSWERING PROCESSING METHOD

BACKGROUND OF THE INVENTION

1. Field of the Invention

This invention relates to a natural language processing system using a computer to operate as a question answering system for outputting an answer to a question statement expressed in a natural language. More specifically, the present invention relates to a question answering system which adds up evaluation points of a plurality of answer candidates having the same language expression when extracting candidates of answers to the question, obtains the evaluation points and outputs an answer candidate with a higher evaluation point than a predetermined point assigned as an answer.

The question answering system refers to a system which outputs, when a question in a natural language is input, an answer to the question itself. For example, suppose a question "which part of the brain whose cells are dead is related to symptoms of Parkinson's disease?" is input to the question answering system. The question answering system finds out a statement "Parkinson's disease is the to be caused when melanocyte in the substantia nigra of the midbrain denatures and dopamine which is a neurotransmitter created in substantia nigra cells is lost" from a massive amount of digitized text including data such as Web pages, news articles, encyclopedia and outputs an answer "substantia nigra" precisely.

Since the question answering system can extract an answer not from a logical expression or database but from a plain statement (text data) written in a natural language, it is possible to use a massive amount of existing document data.

Furthermore, unlike an information retrieval system which the user needs to find out an answer from articles retrieved using keywords, the question answering system outputs a solution itself accurately, and therefore the user can obtain information on the solution more quickly.

Furthermore, the question answering system automatically outputs the solution itself, and therefore it can also be used as a knowledge processing system inside another automatic knowledge processing system and it is considered as a minimum necessary processing technology when an artificial intelligence system is created.

Such a useful question answering system is considered to be a backbone system for intelligent processing and knowledge processing in the future and great expectations are placed on the improvement of its processing capacity.

2. Description of the Related Art

A general question answering system is roughly made up of three processing means of answer expression estimation processing, document retrieval processing and answer extraction processing.

The answer expression estimation processing is processing which estimates an answer expression based on an expression of an interrogative pronoun, etc., in a question statement entered. An answer expression is a type of language expression of a desired answer. The question answering system predetermines the correspondence of what kind of language expression of a question statement requires what kind of answer expression. Then, when the question statement entered is, for example, "what is an approximate area of Japan?", the question answering system references the predetermined correspondence and estimates that the answer expression will be "numerical expression" from the expression of "what is an approximate area" in the question statement. Furthermore, when the question statement is "who is Japan's prime minister?", the question answering system estimates that the answer expression will be a "proper noun (personal name)" from the expression "who" in the question statement.

The document retrieval processing extracts keywords from the question statement, retrieves a document data group using the extracted keywords and extracts document data in which the answer is considered to be written. When the question statement entered is, for example, "what is an approximate area of Japan?", the question answering system extracts "Japan" and "area" as keywords from the question statement and retrieves document data including the extracted keywords "Japan" and "area" from various document data groups to be retrieved.

The answer extraction processing extracts a language expression that matches the estimated answer expression from the document data including keywords extracted through the document retrieval processing and outputs the language expression as an answer. The question answering system extracts the language expression corresponding to the "numerical expression" estimated through the answer expression estimation processing from the document data including the keywords "Japan" and "area" retrieved through the document retrieval processing as an answer.

Through the above described processing, in response to a question statement "what is the capital of Japan?", the question answering system outputs an answer "Tokyo." Nowadays, there is also a question answering system in which when an answer is output, points (evaluation points) for evaluating answer candidates such as a degree of matching are assigned to answer candidates and an answer candidate which has acquired predetermined evaluation points is output as an answer. For example, suppose when evaluation points are assigned to answer candidates for the question statement "what is the capital of Japan?", "rank; answer candidate; evaluation point; document data identification information (document number) from which the answer candidate is extracted" are output as answer candidate data as follows:

1; Kyoto; 3.3; document number 134,
2; Tokyo; 3.2; document number 12,
3; Tokyo; 2.8; document number 455,
4; Tokyo; 2.5; document number 371,
5; Tokyo; 2.4; document number 221,
6; Beijing; 2.2; document number 113

Then, when the question answering system adopts the first rank answer candidate and outputs "Kyoto" as an answer, a wrong answer is output because the correct answer is "Tokyo."

Thus, within the document data which becomes the answer retrieval target, language expressions appearing at many locations together with the expression relating to the content of the question are considered to have more relatedness with regard to the question and can be considered to match the answer of the question better. Based on this concept, for answer candidates having the same language expressions appearing in different document data or at different locations in the document data, there is a technique of adding up evaluation points of the respective answer candidates and regarding the sum total as the evaluation point of the answer candidate (for example, see Reference 1).

[Reference 1: Toru Takaki, Yoshio Eriguchi, "NTTDATA Question-Answering Experiment at the NTCIR-3 QAC", National Institute of Informatics, The NTCIR Workshop 3 Meeting (3rd NTCIR workshop meeting), October 2002, p. 95-100]

For example, in the example of the aforementioned answer candidate for the question statement "what is the capital of Japan?", evaluation points of answer candidates are simply added up and counted using the conventional technique. When evaluation points given to the answer candidates "Tokyo" appearing in four document data pieces or at four locations out of the aforementioned answer candidates are counted and regarded as the evaluation point of the answer candidate "Tokyo", the evaluation ranking of each answer candidate for the question statement is as follows:

1; Tokyo; 10.9; document number 12,455,371,221,
2; Kyoto; 3.3; document number 134,
3; Beijing; 2.2; document number 113

Then, since the first rank answer candidate "Tokyo" is adopted in the question answering system, the answer output from the question answering system is correct.

However, as shown in Reference 1 above, according to the conventional art of simply adding up the evaluation points of the answer candidates extracted from the document data which is the answer retrieval target for each answer candidate having the same language expression and adopting the answer candidate with an evaluation point equal to or higher than a predetermined level assigned as the answer, there is a problem that a language expression appearing with a high frequency in the document data is likely to be selected as an answer and the accuracy of the answer does not necessarily improve.

Especially when a technique of simple evaluation point addition processing is applied to a question answering system with high accuracy of the answer candidate extraction processing itself, this problem appears more serious. In a question answering system which carries out high accuracy answer candidate extraction processing, though the reliability of evaluation points assigned through the original processing is high, answer candidates are extracted by applying the conventional technique of adding evaluation points to this answer candidate extraction processing based on the total point simply calculated from evaluation points of answer candidates. As a result, many answer candidates whose evaluation itself is low are evaluated higher, which leads to reduce the answering accuracy contrarily.

SUMMARY OF THE INVENTION

The present invention has been implemented in view of the above described problems and it is an object of the present invention to provide a technique of extracting answer candidates capable of improving the accuracy of extracting answer candidates by counting evaluation points of the same answer candidate and reducing an adverse effect that answer candidates which appear with a high frequency are likely to be evaluated higher.

The present invention is a question answering system which receives question statement data expressed in a natural language and outputs an answer to the question statement data from a document data group which is an answer retrieval target, comprising 1) answer type estimating means for analyzing the language expression of the input question statement data and estimating an answer type which is a type of language expression which can be an answer to the question statement data, 2) document retrieving means for extracting keywords from the question statement data, retrieving and extracting document data including the keywords from the document data group, 3) answer candidate evaluation point calculating means for extracting a language expression which can be the answer from the document data as answer candidates and assigning evaluation points to the answer candidates, 4) answer candidate evaluation point counting means for sorting, when evaluation points are counted for each answer candidate having the same language expression, the evaluation points of answer candidates having the same language expression in descending ranking order of evaluation, calculating values of the evaluation points using such weighting that the value processed for each evaluation point diminishes as the rank of the evaluation point decreases and regarding the sum total of the values as the evaluation point of the answer candidate having the same language expression and 5) answer outputting means for outputting an answer candidate whose evaluation point counted by the answer candidate evaluation point counting means is equal to or higher than a predetermined evaluation value as an answer.

The question answering system of the present invention analyzes a language expression of input question statement data and estimates the answer type which is a type of language expression which can be an answer to the question statement data. Then, it extracts keywords from the question statement data and retrieves and extracts document data including the keywords from the document data group. Furthermore, it extracts a language expression which can be the answer from the document data as an answer candidate and assigns an evaluation point to the answer candidate. Then, when evaluation points are counted for each answer candidate having the same language expression, the evaluation points of answer candidates having the same language expression are sorted in descending ranking order of evaluation ranking and the values of the evaluation points are calculated using such weighting that the value to be processed for each evaluation point diminishes as the rank of the evaluation point decreases. Then, the sum total of the values is regarded as the evaluation point of the answer candidate having the same language expression and an answer candidate whose evaluation point counted by the answer candidate evaluation point counting means is equal to or higher than a predetermined evaluation value is output as an answer.

Furthermore, the present invention is the question answering system having the above described structure, wherein when counting evaluation points for each answer candidate having the same language expression, the answer candidate evaluation point counting means sorts and ranks evaluation points of answer candidates having the same language expression in descending ranking order of evaluation. Then, assuming that n is the number of answer candidates having the same language expression and $Point_i$ ($1 \leq i \leq n$) is a ranking order of evaluation points of the answer candidates, it is possible to calculate Score using a formula 1;

$$Score = \Sigma 1/(i+b)/(i+b-1) * Point_i \qquad (1)$$

where $\Sigma$ is the sum total when i takes a value from 1 to n; from which each sum total of the value of the answer candidates as the representative evaluation point of the answer candidate having the same language expression.

Or when counting evaluation points for each answer candidate having the same language expression, the answer candidate evaluation point counting means sorts the evaluation points of answer candidates having the same language expression in descending ranking order of evaluation, and assuming that n is the number of answer candidates having the same language expression and $Point_i$ ($1 \leq i \leq n$) is a ranking order of evaluation points of the answer candidates, it is possible to calculate Score using a formula 2;

$$Score = \Sigma k^{j-1} * Point_i \qquad (2)$$

where $\Sigma$ is the sum total when i takes a value from 1 to n; from which each sum total of the value of the answer candidates as the representative evaluation point of the answer candidate which is the same language expression.

According to the question answering system of the present invention, when evaluation points assigned to answer candidates having the same extracted language expression are counted, the assigned evaluation points are sorted in descending order and values of the evaluation points are calculated using such weighting that the value processed on each evaluation point diminishes as the rank of the evaluation point decreases and the evaluation points are added up. More specifically, when answer candidates are extracted, evaluation points of answer candidates having the same language expression are sorted in descending order of evaluation ranking, the value of each evaluation point P is calculated using such weighting that the value diminishes as the rank of the evaluation point decreases and the sum total of the values of weighted evaluation points P is calculated.

In this way, in the weighting processing of each answer candidate, evaluation point P is subtracted at a higher rate than that of evaluation point P which is directly superior thereto. Therefore, the lower the initial evaluation of an answer candidate, the smaller the influence of the counted evaluation point on the sum total becomes, and therefore the influence of the answer extraction processing on the accuracy of processing also decreases.

Furthermore, in the evaluation of an answer candidate, it is possible to reduce an adverse influence that an answer candidate which appears with a high frequency is relatively likely to be evaluated higher, and therefore the present invention exerts the effect of improving the processing accuracy of extracting answer candidates.

BRIEF DESCRIPTION OF THE DRAWINGS

FIG. 3 illustrates processing accuracy in each processing example for a predetermined question setting;

FIG. 4 illustrates processing accuracy in each processing example for a predetermined question setting;

FIG. 5 illustrates processing accuracy in each processing example for a predetermined question setting;

FIG. 6 illustrates processing accuracy in each processing example for a predetermined question setting; and FIG. 7 illustrates processing accuracy in each processing example for a predetermined question setting.

DETAILED DESCRIPTION OF THE PREFERRED EMBODIMENTS

Figure 1:
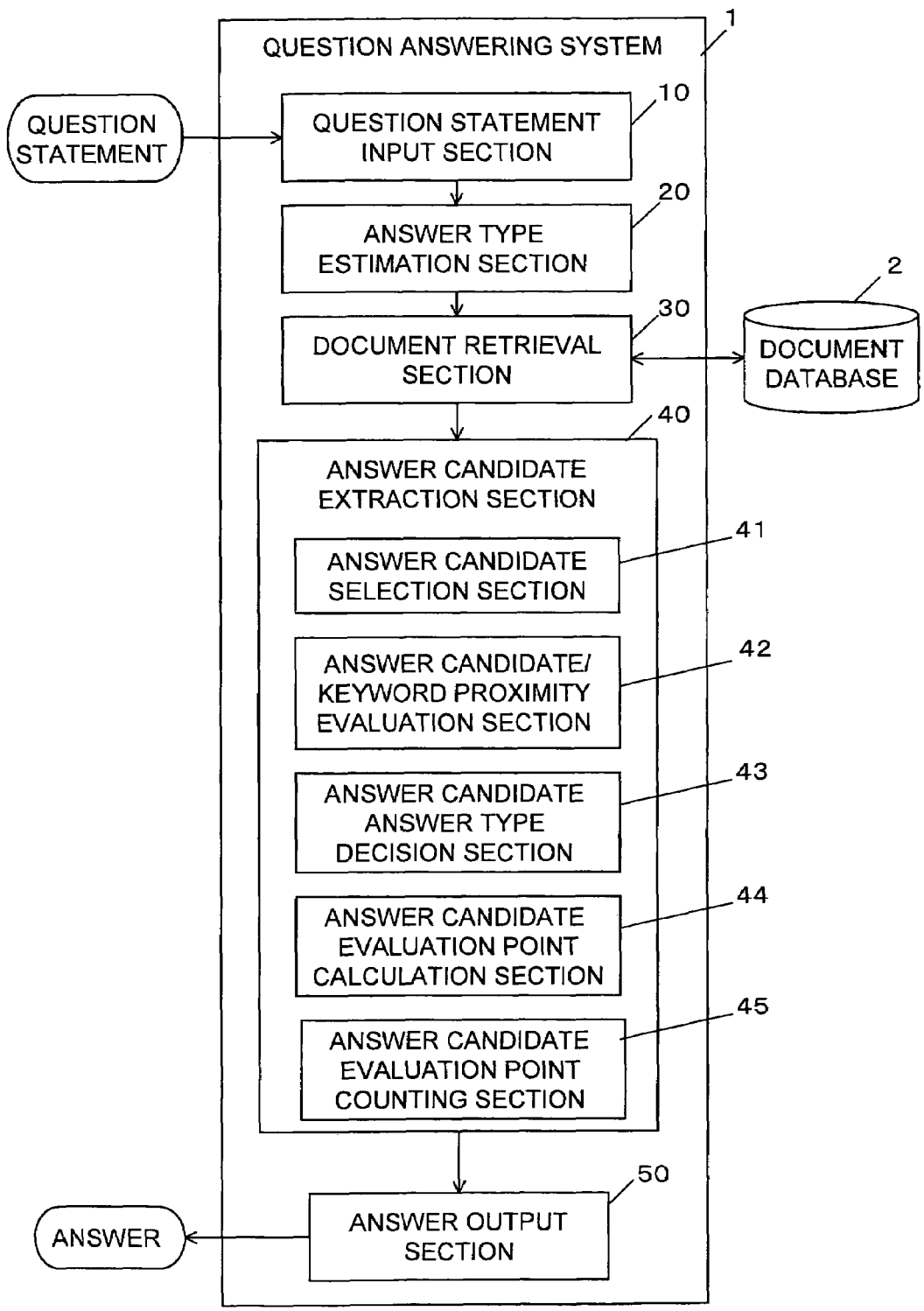
FIG. 1 illustrates a configuration example of a question answering system according to the present invention.

FIG. 1 shows a configuration example of a question answering system 1 of the present invention. The question answering system 1 is provided with a question statement input section 10, an answer type estimation section 20, a document retrieval section 30, an answer candidate extraction section 40, an answer output section 50 and a document database 2.

The question statement input section 10 is the means for inputting a question statement expressed in a natural language.

The answer type estimation section 20 is the means for analyzing the question statement input by the question statement input section 10 and estimating the answer type of an answer to be output based on an answer type estimation rule.

Suppose the answer type and answer type estimation rule are prepared beforehand. The answer type is the type of a language expression which can be an answer to be output and, for example, types of proper nouns such as a personal name, geographic name, organization name, numerical expression such as quantity and sum of money and time expression are set. The answer type estimation rule is a heuristic rule which estimates the corresponding answer type of the answer according to the expression such as expression of a question statement or expression of an interrogative included in the question statement and, for example, the following rules are defined:

1) When the question statement includes an expression "who," the answer type is "personal name."
2) When the question statement includes an expression "when," the answer type is "time expression."
3) When the question statement includes an expression "how many (or much)," the answer type is "numerical expression."

The document retrieval section 30 is the means for retrieving and extracting document data including keywords from the document database 2 which is the answer retrieval target using keywords extracted from the question statement entered by the question statement input section 10. The document retrieval section 30 uses a generally known document retrieval technique.

The answer candidate extraction section 40 is the means for extracting a language expression to be a possible answer with an evaluation point assigned from the document data retrieved by the document retrieval section 30 as an answer candidate, deciding the answer type of the extracted answer candidate, and further counting the evaluation point of the answer candidate. The answer candidate extraction section 40 is constructed of an answer candidate selection section 41, an answer candidate/keyword proximity evaluation section 42, an answer candidate answer type decision section 43, an answer candidate evaluation point calculation section 44 and an answer candidate evaluation point counting section 45.

The answer candidate selection section 41 is the means for extracting a language expression to be a possible answer from the document data retrieved by the document retrieval section 30 and generating an answer candidate. The answer candidate/keyword proximity evaluation section 42 stochastically evaluates proximity between an answer candidate within the document data of an extraction source and keywords and assigns an evaluation point $p_1$ based on the proximity to the answer candidate.

The answer candidate answer type decision section 43 is the means for deciding the answer type of the answer candidate generated by the answer candidate selection section 41 based on a predetermined answer type decision rule and assigning an evaluation point $p_2$ according to the decided answer type to the answer candidate. The answer type decision rule is the rule that defines the correspondence between answer types as the answer type estimation rule. When the decided answer type is the same as the answer type estimated by the answer type estimation section 20, the answer candidate answer type decision section 43 evaluates it particularly high and evaluates higher as the relatedness to the estimated answer type becomes stronger.

The answer candidate evaluation point calculation section 44 is the means for totaling evaluation points $p_1$ assigned by the answer candidate/keyword proximity evaluation section 42 and evaluation points $p_2$ assigned by the answer candidate answer type decision section 43 for each answer candidate to calculate an evaluation point P.

When there are a plurality of answer candidates having the same language expression in the extracted answer candidates, the answer candidate evaluation point counting section 45 is the means for counting evaluation points for each answer candidate having the same language expression. More specifically, the answer candidate evaluation point counting section 45 sorts evaluation points P of answer candidates having the same language expression in descending ranking order of evaluation, assigns weights to the respective evaluation points P in such a way that evaluation points P to be added diminish and calculates the sum total of the weighted evaluation points P. In the weighting processing of each answer candidate, an evaluation points P is added as a value subtracted at a greater rate than that of the evaluation point P immediately superior thereto. Thus, the lower the initial evaluation point of an answer candidate, the smaller the influence on the sum total of the counted evaluation points becomes, and therefore the influence of the original answer extraction processing on the processing accuracy also decreases.

The answer output section 50 is the means for outputting an answer candidate with a higher evaluation point than a predetermined level as an answer from among answer candidates extracted by the answer candidate extraction section 40 and with evaluation points assigned.

Figure 2:
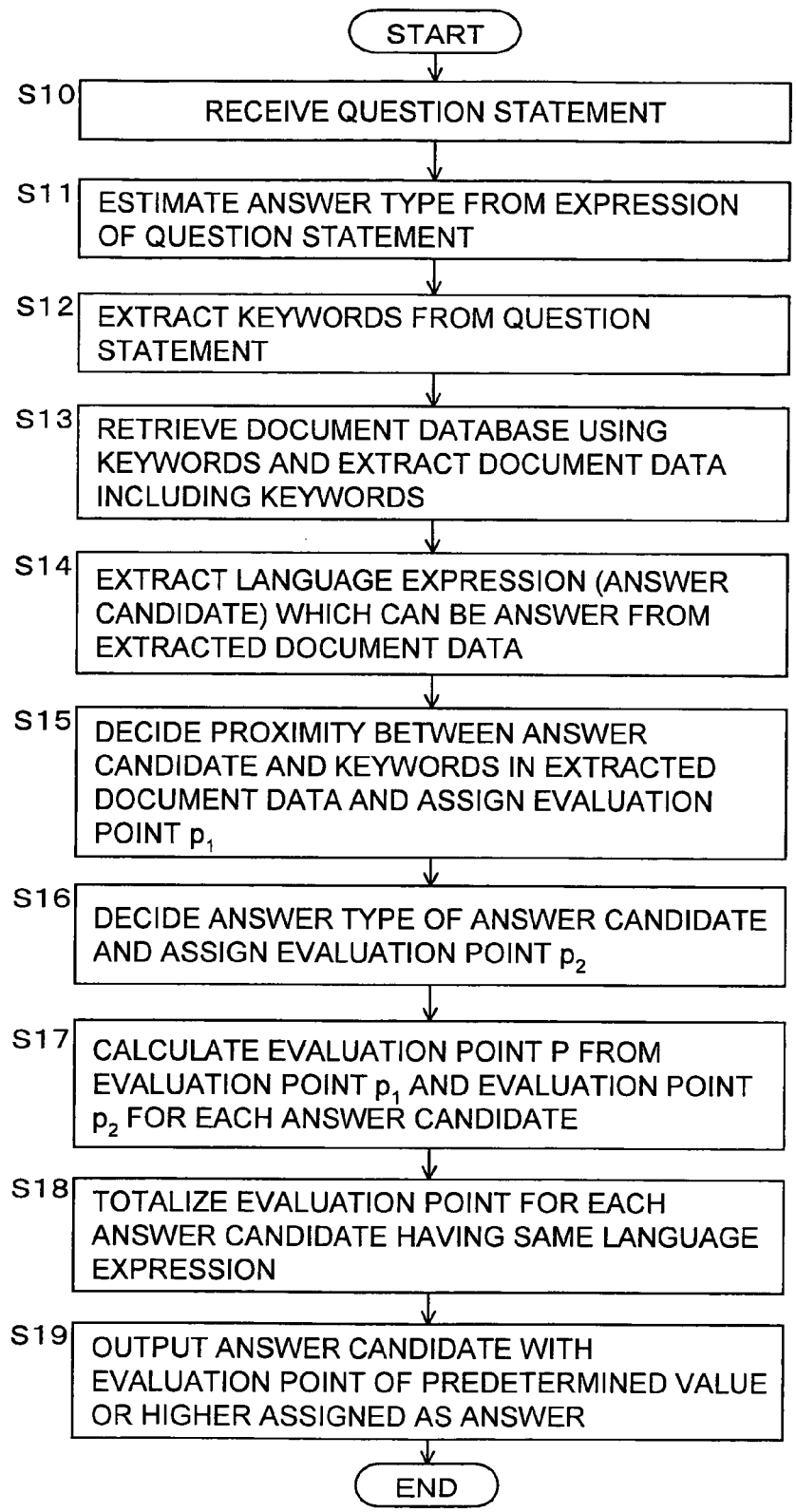
FIG. 2 illustrates a processing flow of the present invention.

FIG. 2 shows a processing flow of the present invention. The question statement input section 10 of the question answering system 1 receives a question statement (step S10). The answer type estimation section 20 estimates the answer type from the expression of the question statement (step S11). The answer type estimation section 20 carries out a morphological analysis on the question statement entered, references a predetermined answer type estimation rule based on the expression of an analyzed interrogative pronoun, etc., and estimates the answer type of the answer to the question statement. For example, when the question statement entered is "what is an approximate area of Japan?", the answer type estimation section 20 extracts the expression "what is an approximate area" from the question statement, references the aforementioned answer type estimation rule and estimates that the answer type is "numerical expression."

Then, the document retrieval section 30 extracts keywords from the question statement (step S12), retrieves the document database 2 using the extracted keywords and extracts document data including the keywords (step S13). When the question statement entered is "what is an approximate area of Japan?", the document retrieval section 30 carries out a morphological analysis on the question statement, extracts nouns "Japan, area" from the question statement as keywords. It retrieves the document database 2 using the keywords "Japan, area" and extracts the document data including the keywords "Japan, area." As a result of retrieval, the extracted document data becomes the target from which the answer to the question statement is extracted.

Then, the answer candidate selection section 41 of the answer candidate extraction section 40 extracts an answer candidate having the language expression which can be an answer from the extracted document data (step S14). For example, the answer candidate selection section 41 extracts a characteristic string "n-gram" from the extracted document data and extracts language expressions decided to be noun phrases, unknown phrases, symbols, etc., from among the language expressions as answer candidates.

Furthermore, the answer candidate/keyword proximity evaluation section 42 decides the proximity in the location of appearance between the extracted answer candidate and keyword in the document data and assigns evaluation point $p_1$ to the answer candidate (step S15). Here, it is assumed that within the retrieved document data, as an answer candidate appears closer to the keyword, that is, the answer candidate and keyword appear within a narrower range, the answer candidate and keyword have a higher level of mutual relatedness and an answer candidate having a high level of relatedness to the keyword is better as the answer to the question statement. Then, the answer candidate/keyword proximity evaluation section 42 assigns a higher evaluation point $p_1$ as the answer candidate appears closer to the keyword.

Furthermore, the answer candidate answer type decision section 43 decides the answer type of an answer candidate extracted from the processing in step S14 and assigns evaluation point $p_2$ (step S16). The answer candidate answer type decision section 43 references a predetermined answer type decision rule, decides the answer type of the answer candidate and assigns evaluation point $p_2$ to the answer candidate according to the decided answer type. When it is decided that the answer type of the answer candidate is the same as the answer type estimated in the processing of step S11, the answer candidate answer type decision section 43 assigns the highest evaluation point (e.g., 1,000 points) to the answer candidate and when the language expression of the answer candidate is a language expression which cannot be the answer type, it assigns a minus evaluation point (e.g., −1,000, 000) to the answer candidate.

Furthermore, the answer candidate evaluation point calculation section 44 calculates an evaluation point P from the evaluation point $p_1$ and evaluation point $p_2$ for each answer candidate (step S17). The evaluation point calculation section 44 totalizes the evaluation point $p_1$ assigned through the processing in step S15 and the evaluation point $p_2$ assigned through the processing in step S16 for each answer candidate as the evaluation point P of the answer candidate.

Then, the answer candidate evaluation point counting section 45 totalizes evaluation points P for each answer candidate having the same language expression (step S18). When there are a plurality of answer candidates having the same language expression in the answer candidates extracted through the processing in step S14, the answer candidate evaluation point counting section 45 gathers those answer candidates into one and assigns an evaluation point Score as one answer candidate.

The answer candidate evaluation point counting section 45 sorts the respective evaluation points P of the answer candidates having the same language expression in descending ranking order of evaluation as below:

$\text{Point}_i (1 \leq i \leq n)$, $\text{Point}_i (1 \leq i \leq n)$, where n=number of answer candidates having the same language expression.

Then, the evaluation points P of answer candidates are added up using either one of the following two methods to count the evaluation point Score.

(1) First Counting Method $$\text{Score} = \Sigma (1+b)*b/(i+b)/(i+b-1)*\text{Point}_i \quad \text{(Formula 1)}$$

($\Sigma$ is the sum total when i takes a value from 1 to n).

Here, "(1+b)*b" is a constant and has no influence on the order relationship, and therefore it is omissible.

(2) Second Counting Method $$\text{Score} = \Sigma k^{i-1} * \text{Point}_i \quad \text{(Formula 2)}$$

($\Sigma$ is the sum total when i takes a value from 1 to n)

Here, the evaluation point Score is the sum total of weighted evaluation points P and weights of the respective answer candidates are subtracted at a greater rate than weights for the evaluation point P of immediately superior thereto and added.

Then, the answer output section 50 selects an answer candidate assigned an evaluation point Score equal to or greater than a predetermined value and outputs it as an answer (step S19).

Furthermore, the present invention will be explained using another embodiment.

In another embodiment, a question answering system 1' of the present invention has substantially the same structure of the processing means as that shown in FIG. 1, but it is provided with an answer type estimation section 20' and an answer candidate answer type decision section 43' instead of the answer type estimation section 20 and answer candidate answer type decision section 43.

Instead of carrying out processing using heuristic rules to estimate or decide a predetermined answer type, the answer type estimation section 20' and answer candidate answer type decision section 43' of the question answering system 1' estimate or decide an answer type using a supervised machine learning method. In this case, predetermined answer types are prepared and patterns of pairs of a correct input (question statement) and output (estimated answer type) are manually prepared beforehand as teaching data (learning data) for each problem.

The answer type estimation section 20' receives teaching data which is a pair of a question statement and estimated answer type first and then analyzes the question statement into predetermined features, learns what answer type it is likely to become in what kind of question statement features through machine learning processing and stores the learning result. Then, the answer type estimation section 20' likewise analyzes the question statement (input) entered from the question statement input section 10 into features, obtains the probability that it may become the answer type from the learning result for each feature and estimates the answer type with the highest probability as the answer type (output) of the question statement.

As with the answer type estimation section 20', the answer candidate answer type decision section 43' receives an answer candidate and teaching data paired with the answer type decided, learns what answer candidate is likely to become what answer type through machine learning processing and stores the learning result. Then, the answer candidate answer type decision section 43' determines the probability that each answer candidate generated by the answer candidate selection section 41 is likely to become each answer type and estimates the answer type with the highest probability as the answer type of the answer candidate.

The machine learning method used by the answer type estimation section 20' or answer candidate answer type decision section 43' includes, for example, a maximum entropy method and support vector machine method or the like.

The maximum entropy method is a processing technique that determines a probability distribution whose entropy becomes a maximum on condition that an expected value of appearance of a feature which is a small unit of information used to estimate learning data is equal to an expected value of appearance of a feature of unknown data, determines based on the probability distribution determined a probability that each appearance pattern of the feature may fall under each category and regards the category having the maximum probability as the category to be determined.

The support vector machine method is a technique that classifies data consisting of two categories by splitting a space by a hyperplane and assuming a concept that the possibility of wrong classification in unknown data is lower for learning data having a greater distance (margin) between an instance group of two categories and the hyperplane, determines the hyperplane that maximizes this margin and carries out classification using the hyperplane. When data having three or more categories is classified, the data is processed by combining a plurality of support vector machines.

In the case of a structure with the answer type estimation section 20' or answer candidate answer type decision section 43' including a machine learning processing function, only preparing learning data can realize a highly versatile question answering system 1' applicable to problems of all descriptions.

Furthermore, the answer type estimation sections 20, 20' and answer candidate answer type decision sections 43, 43' may also be adapted so as to carry out either processing using a machine learning method with a teacher or processing using heuristic rules.

Furthermore, the answer type estimation sections 20, 20' and answer candidate answer type decision sections 43, 43' may also be adapted so as to carry out processing combining processing using a machine learning method with a teacher and processing using heuristic rules. That is, the answer type estimation rule or answer type decision rule is adapted so as to include a rule that "a high evaluation point will be assigned when the estimation result of processing according to a machine learning method coincides with the estimation result/decision result obtained based on the answer type estimation rule or answer type decision rule."

Note that the following Reference 2 describes a question answering system using a machine learning method:

[Reference 2: Eisaku Maeda, "Question Answering Viewed from Pattern Recognition/Statistical Learning", Natural Language Understanding and Methods of Communication, seminar material, Institute of Electronics, Information and Communication Engineers, Natural Language Understanding and Methods of Communication (NLC), Jan. 27, 2003, p. 29-64]

SPECIFIC EXAMPLE

A specific example of processing according to the present invention together with a processing example using a conventional processing method will be explained below.

Suppose a first example and a second example will be processing according to a conventional method for a comparison with the present invention. In the first example, even if there are a plurality of answer candidates having the same language expression extracted from different articles, answers are evaluated without adding up evaluation points of answer candidates. In the second example, evaluation points of answer candidates having the same language expression are simply added up and the answer candidates thereof are evaluated.

Suppose a third example and a fourth example are examples according to the present invention. In the third example, evaluation points of answer candidates having the same language expression are counted according to a first counting method and the answer candidates are evaluated. In the fourth example, evaluation points of answer candidates are counted according to a second counting method and the answer candidates are evaluated.

As shown in the following Reference 3, in the first to fourth examples, assuming that the question statement to be entered is "what is an approximate area of Japan?", a news article corpus corresponding to news articles in 1998-1999 of Mainichi Newspaper Co., Ltd. was used as the document database 2 to be the answer retrieval target.

[Reference 3: Masaki Murata, Masao Utiyama, and Hitoshi Isahara, "A Question-Answering System Using Unit Estimation and Probabilistic Near-Terms IR", National Institute of Informatics, NTCIR Workshop 3 Meeting (3rd NTCIR workshop meeting), 2002]

Furthermore, in each example of processing, a plurality of systems in which the respective processing means of the question answering system 1 having the structure shown in FIG. 1 were provided to carry out the following specific processing.

The first question answering system is the system which carries out the processing disclosed in Reference 2 and an outline of the processing is as follows (see Reference 3, Section 3.4).

Answer type estimation processing: a predetermined question statement is input, a manually prepared answer type estimation rule is referenced and an answer type is estimated from expressions of a question statement.

Document retrieval processing: Furthermore, keywords are extracted from a question statement through morphological analysis processing and the document data of the above described news article corpus is retrieved as a complete statement without dividing it. The document data including the keywords is extracted.

Answer candidate extraction processing: Language expressions that can be answers are extracted from the extracted document data, used as answer candidates and evaluation point $p_1$ is assigned to the answer candidates using a predetermined expression (here, $Score_{near1}$ described in Reference 2) based on the proximity of appearance between the answer candidates and keywords. Evaluation point $p_1$ is calculated in such a way that higher evaluations are obtained as the answer candidates appear closer to the keywords.

Furthermore, with reference to predetermined answer type decision rules, it is decided whether the answer candidates are similar to the answer type estimated by the answer type estimation processing or not and evaluation point p2 is assigned in such a way that higher evaluations are obtained as the answer candidates are more similar to the estimated answer type. Especially when the answer candidates are of the same answer type as that estimated, particularly higher evaluation points (1,000 points) are assigned.

The answer type decision rule is adapted so as to include a rule that higher evaluation points (1,000 points) are assigned when the processing result according to the machine learning method provided with predetermined teaching data coincides with the decision result according to the answer type decision rule and higher evaluation points (1,000 points) are assigned to the answer candidates that satisfy this rule. In this way, the answer type of the answer candidate is decided through the processing by the machine learning method combined with the processing using the heuristic rule.

The second question answering system executes the processing substantially the same as the first question answering system.

In the answer candidate extraction processing, the second question answering system does not carry out processing using meaningful information on the answer candidates. That is, the answer type of the answer candidate is not decided and no evaluation point $p_2$ of the answer candidate is calculated, and therefore an answer is extracted from among the analysis candidates based on only the evaluation point $p_1$.

In the answer candidate extraction processing, the third question answering system assigns evaluation points to the answer candidates without using proximity between the answer candidates and keywords based on the appearance of the answer candidate and keyword within the same document data. Here, evaluation point $p_1$ will be calculated using an expression with k=1 in $Score_{near2}$ described in Reference 2.

The fourth question answering system carries out substantially the same processing as the above described third question answering system. In the document retrieval processing, the fourth question answering system divides the document data which is the retrieval target into paragraphs and then carries out retrieval and decides the appearance of answer candidates and keywords paragraph by paragraph and carries out evaluations.

The fifth question answering system carries out substantially the same processing as the above described first question answering system. In the document retrieval processing, the fifth question answering system divides the document data which is the retrieval target into paragraphs beforehand and then retrieves them, decides proximity of appearance between the answer candidates and keywords paragraph by paragraph and carries out evaluations.

The first example to the fourth example will be explained below. Processing was carried out using two problem setting tasks; Task 1 and Task 2. The total number of question statements was 200 each (see Reference 2).

FIRST EXAMPLE

In the first example, even if there were a plurality of answer candidates having the same language expression extracted from different articles in the first to fifth question answering systems, no evaluation points of answer candidates were added up and an answer was selected based on evaluation points assigned to the respective answer candidates.

SECOND EXAMPLE

In the second example, evaluation point counting processing was carried out after answer candidate extraction processing.

In the evaluation point counting processing, the evaluation points P of the answer candidates having the same language expression extracted from different articles were simply added up as the evaluation points of the answer candidates and an answer was selected based on the evaluation points assigned to the answer candidates.

Note that as described above, higher evaluation points (1,000 points) were assigned to the answer candidates which can be considered matching the estimated answer type, and therefore evaluations of the answer candidates drastically change in units of 1,000 points. For this reason, in order to prevent any influence on values of higher digits than the digit of 1,000 (thousand) of evaluation points, values of lower digits (hundred) than the digit of 1,000 (thousand) are extracted from the evaluation points and the extracted values (evaluation points) are added up. Then, the remaining values of digits equal to or higher than the digit of 1,000 (thousand) of the evaluation points P of the answer candidates and the values of the digit (hundred) lower than the digit of 1,000 (thousand) are added up as the evaluation points P of the answer candidates. Furthermore, the evaluation points of answer candidates having different values of the digit equal to or higher than the digit of 1,000 (thousand) are not added up.

For example, suppose two answer candidates A having the same language expression appear at two locations and the respective evaluation points are 1,025 and 1,016. Then, the evaluation point of the answer candidate A is 1,041. Furthermore, suppose the answer candidate B having the same language expression appears at two locations resulting in evaluation points 2,025 and 2,016. Then, the evaluation point of the answer candidate B is 2,041. Furthermore, if the answer candidate C appears at two locations and their respective evaluation points are 2,025 and 1,016, the evaluation point of the answer candidate C is 2,025.

THIRD EXAMPLE

In the third example, evaluation point counting processing is carried out after answer candidate extraction processing. In the evaluation point counting processing, evaluation points P of answer candidates having the same language expression extracted from different articles were counted based on the first counting method of the present invention as the evaluation points of the answer candidates and an answer was selected based on the evaluation point assigned to the answer candidate.

As in the case of the second example, the evaluation point P of the extracted answer candidate was divided at the digit of 1,000 (thousand) and values of lower digits were added up.

In the evaluation point counting processing, various values were assigned to b of the following expression and evaluation point Score was calculated:

$$\text{Score} = \Sigma (1+b) * b/(i+b)/(i+b-1) * \text{Point}_i$$

($\Sigma$ is the sum total when i takes a value of 1 to n)

For example, when the answer candidate D appears at two locations and their respective evaluation points are 2,025 and 2,016.25 and 16 which are the values of the respective evaluation points at the digit equal to or lower than the digit of 1000 are extracted as $\text{Point}_1$ and $\text{Point}_2$.

When b=1, the evaluation point of the final answer candidate D becomes 2,030.33.

$$\text{Score} = \sum (1+b) * b/(i+b)/(i+b-1) * \text{Point}_i$$
$$\text{Score} = (1+1) * 1/(1+1)/(1+1-1) * 25 +$$
$$(1+1) * 1/(2+1)/(2+1-1) * 16$$
$$= 30.33$$

Furthermore, when b=0.1, the evaluation point of the final answer candidate D becomes 2025.76.

$$\text{Score} = \sum (1+b) * b/(i+b)/(i+b-1) * \text{Point}_i$$
$$\text{Score} = (1+0.1) * 0.1/(1+0.1)/(1+0.1-1) * 25 +$$
$$(1+0.1) * 0.1/(2+0.1)/(2+0.1-1) * 16$$
$$= 25.76$$

FOURTH EXAMPLE

In the fourth example, evaluation point counting processing was carried out after answer candidate extraction processing. In the evaluation point counting processing, evaluation points P of answer candidates having the same language expression extracted from different articles were counted based on the second counting method of the present invention as the evaluation point of the answer candidate and an answer was selected based on the evaluation point assigned to the answer candidate.

As in the case of the second example, the evaluation point P of the extracted answer candidate was divided at the digit of 1,000 (thousand) and values at lower digits were added up.

In the evaluation point counting processing, various values were assigned to k of the following expression and an evaluation point Score was obtained.

$$\text{Score} = \Sigma k^{i-1} * \text{Point}_i$$

($\Sigma$ is the sum total when i takes a value of 1 to n)

For example, suppose the answer candidate D appears at two locations and the respective evaluation points are evaluation points 2,025 and 2,016.25 and 16 which are values at the digit equal to or lower than the digit of 1,000 (thousand) of the respective evaluation points are extracted as $\text{Point}_1$ and $\text{Point}_2$. When k=0.1, the evaluation point of the final answer candidate D becomes 2,026.6.

$$\text{Score} = 25 + 16 * 0.1$$
$$= 26.6$$

Furthermore, when k=0.01, the evaluation point of the final answer candidate D becomes 2025.16.

$$\text{Score} = 25 + 16 * 0.01$$
$$= 25.16$$

As the evaluation technique in the first to fourth examples of the first to fifth question answering systems, the processing accuracy of problem setting tasks; Task1 and Task2 was evaluated using an evaluation scale called "MRR" for Task1 and an evaluation scale called "MF" for Task2.

The MRR causes the question answering system to output five solutions in sequence and when a correct answer is obtained at the rth solution, the accuracy of 1/r is obtained. Such a value was obtained in each question statement and this value divided by 200 question statements was regarded as the processing accuracy.

The MF is obtained by calculating the accuracy of each question with F-measure and averaging this with 200 question statements. F-measure is a reciprocal of the average of the reciprocal of a reproduction rate and the reciprocal of an adaptation rate. The reproduction rate is the number of correct solutions of each question answering system divided by the number of correct solutions. The adaptation rate is the number of correct solutions of each question answering system divided by the number of answers output from the system.

In Task2, a problem is set in such a way as to allow question statements, for example "which countries are permanent members of the Security Council of the United Nations?" for which a plurality of language expressions can be answers to be evaluated. Since Task2 allows a plurality of answers to be output, the processing accuracy is examined using the evaluation scale of the MF. In the question answering system having the structure such as the first to fifth question answering systems, it is possible to give a plurality of answers by considering several higher level answers with high evaluation points or from the evaluation point of the highest answer to an answer with a predetermined evaluation point difference as answers. However, for simplicity of explanations here, the first to fifth question answering systems have a structure of outputting only one highest answer.

FIG. 3 to FIG. 7 show processing accuracy in respective examples corresponding to problem setting tasks; Task1 and Task2. FIG. 3 illustrates processing accuracy in the first question answering system, FIG. 4 illustrates processing accuracy in the second question answering system, FIG. 5 illustrates processing accuracy in the third question answering system, FIG. 6 illustrates processing accuracy in the fourth question answering system and FIG. 7 illustrates processing accuracy in the fifth question answering system.

All the second to fifth question answering systems have a structure of processing means having lower processing performance than the first question answering system. This is done to confirm the effects of the present invention in the third example and fourth example also in the question answering system having inferior performance.

In the first question answering system, the processing accuracy in the second example in which evaluation points are simply added up was lower than that in the first example. However, in the third and fourth question answering systems, it is possible to confirm that the second example acquires higher processing accuracy than the first example.

In the third and fourth question answering systems with lower performance with no information on proximity between keywords and solution candidates, simply adding up evaluation points increases the accuracy. It is evident that depending on the type of the question answering system, the processing accuracy may improve even in the case of the second example in which evaluation points are simply added up. However, even in such a question answering system, by adequately adjusting the value of b or k of the expression used in the third example and fourth example, it is possible to obtain higher processing accuracy than the second example in which evaluation points are simply added up.

In the first and fifth question answering systems, it is evident that processing accuracy in the second example (conventional technique) in which evaluation points of answer candidates are simply added up may be lower than the first example in which evaluation points of answer candidates are not counted. That is, the technique of simple addition processing of evaluation points has a tendency that answer candidates with a higher frequency of appearance are likely to be selected. However, in the question answering system having good processing performance, it is often the case that original evaluation points which are results of extraction processing are more reliable and it is evident that the performance of the question answering system is contrarily lowered due to simple additions of evaluation points as in the case of the second example.

Especially, in the first question answering system, the third example shows an accuracy improvement of a maximum of 0.06 in Task1 and 0.07 in Task2 compared to the first example, that is, the example by the conventional technique and it is evident that this example has notable effects among other examples of the present invention.

Furthermore, when the value of b according to the first counting method or the value of k according to the second counting method ranges from 0.1 to 0.5, the processing accuracy when the third example or fourth example was used was always higher than the processing accuracy when the first example or second example of the conventional technique was used except the second question answering system. Therefore, the value of b or k in the expression preferably ranges from approximately 0.1 to approximately 0.5 and it is evident that the present invention can stably improve processing accuracy compared to the conventional processing technique and is effective for many types of question answering systems.

Note that according to the conventional processing technique whereby evaluation points of answer candidates are simply added up, when the number n of evaluation points is infinite, the value of added evaluation points also becomes infinite and the influence of addition is too strong. In contrast, according to the present invention, when weighting is performed for each evaluation point of answer candidate, even when the number n of evaluation points is infinite, the value of added evaluation points falls within the range of finite values, and therefore appropriate weighting can be realized as the weighting according to the frequency.

Furthermore, the present invention can be implemented as a processing program to be read and executed by a computer. The processing program for implementing the present invention can be stored in an appropriate computer-readable recording medium such as portable medium memory, semiconductor memory and hard disk, provided by being recorded in these recording media or provided by transmission/reception through a communication interface using various communication networks.

The invention may be embodied in other specific forms without departing from the spirit of essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A question answering system which receives question statement data expressed in a natural language and outputs an answer to the question statement data from a document data group which is an answer retrieval target, the system comprising:

answer type information storage means for storing an answer type information that defines a plurality of answer types representing types of language expression, one of which can be the answer to the question statement data, and a relevancy of answer types;

answer type estimating means for analyzing language expressions of the question statement data entered and estimating an answer type which is a type of a language expression that can be the answer to the question statement data based on the answer type information;

document retrieving means for extracting keywords from the question statement data, retrieving and extracting document data including the keywords from the document data group;

answer candidate evaluation point calculating means for extracting language expressions that can be an answer from the document data as answer candidates, determining an answer type of individual answer candidates and assigning evaluation points to the individual answer candidates, the evaluation points being determined in accordance with the answer type of the answer candidate and the relevancy of the answer types being defined in the answer type information;

answer candidate evaluation point counting means for sorting answer candidates having the same language expression, ranking, the evaluation points of the answer candidates having the same language expression in descending order calculating values of the evaluation points using such weighting that the value to be processed for each evaluation point diminishes in descending ranking order of the evaluation points and a value processed for a second-placed evaluation point takes a value chosen in a range from 0.1 to 0.5 of the value, and regarding the sum total of the values as the evaluation point of the answer candidate having the same language expression; and answer outputting means for outputting answer candidates whose evaluation point counted by the answer candidate evaluation point counting means is equal to or higher than a predetermined evaluation as an answer.

2. The question answering system according to claim 1, wherein when counting evaluation points for each answer candidate having the same language expression, the answer candidate evaluation point counting means calculates values of the evaluation points of the answer candidates having the same language expression and sorted and ranked in descending ranking order of evaluation using a formula 1;

$$\text{Score}=\Sigma 1/(i+b)/(i+b-1)*\text{Point}_i \qquad (1)$$

where $\Sigma$ is the sum total when i takes a value of 1 to n; n is the number of answer candidates having the same language expression; and $\text{Point}_i$ ($1 \leq i \leq n$) is the ranking order of evaluation points of the answer candidates; from which each sum total of the values of the answer candidates is obtained as the representative evaluation point of answer candidate having the same language expression.

3. The question answering system according to claim 2, wherein the answer candidate evaluation point counting means calculates the evaluation points using the formula 1 in which b takes a value from 0.1 to 0.5.

4. The question answering system according to claim 1, wherein when counting evaluation points for each answer candidate having the same language expression, the answer candidate evaluation point counting means calculates values of the evaluation points of the answer candidates having the same language expression and sorted and ranked in descending ranking order of evaluation using a formula 2;

$$\text{Score}=\Sigma k^{i-1}*\text{Point}_i \qquad (2)$$

where $\Sigma$ is the sum total when i takes a value of 1to n; n is the number of answer candidates having the same language expression; and $\text{Point}_i$ ($1 \leq i \leq n$) is the ranking order of evaluation points of the answer candidates; from which each sum total of the values of the answer candidates is obtained as the representative evaluation point of answer candidate having the same language expression.

5. The question answering system according to claim 4, wherein the answer candidate evaluation point counting means calculates the evaluation points using the formula 2 where k takes a value from 0.1 to 0.5.

6. A question answering processing method which receives question statement data expressed in a natural language and outputs an answer to the question statement data from a document data group which is an answer retrieval target, the method comprising:

answer type information storage processing by storing an answer type information that defines a plurality of answer types representing types of language expression, one of which can be the answer to the question statement data, and a relevancy of an answer type;

answer type estimation processing by analyzing language expressions of the question statement data entered and estimating an answer type which is a type of a language expression that can be the answer to the question statement data based on the answer type information;

document retrieval processing by extracting keywords from the question statement data, retrieving and extracting document data including the keywords from the document data group;

answer candidate evaluation point calculation processing by extracting language expressions that can be an answer from the document data as answer candidates, determining an answer type of the individual answer candidates and assigning evaluation points to the individual answer candidates, the evaluation points being determined in accordance with the answer type of the answer candidate and the relevancy of the answer types being defined in the answer type information;

answer candidate evaluation point counting processing by sorting answer candidates having the same language expression, ranking the evaluation points of the answer candidates having the same language expression in descending order, calculating values of the evaluation points using such weighting that the value to be processed for each evaluation point diminishes in descending ranking order of the evaluation points and a value processed for a second-placed evaluation point takes a value chosen in a range from 0.1 to 0.5 of the value, and regarding the sum total of the values as the evaluation point of the answer candidate having the same language expression; and answer output processing by outputting answer candidates whose evaluation point counted by the answer candidate evaluation point counting means is equal to or higher than a predetermined evaluation as an answer.

7. The question answering processing method according to claim 6, wherein when evaluation points are counted for each answer candidate having the same language expression in the answer candidate evaluation point counting processing, evaluation points of answer candidates having the same language expression are sorted and ranked in descending ranking order of evaluation, and a formula 1;

$$\text{Score}=\Sigma 1/(i+b)/(i+b-1)*\text{Point}_i \qquad (1)$$

where $\Sigma$ is the sum total when i takes a value of 1 to n; n is the number of answer candidates having the same language expression; and Point ($1 \leq i \leq n$) is the ranking order of evaluation points of the answer candidates; which is calculated to obtain each sum total of the values of the answer candidates as the representative evaluation point of answer candidate having the same language expression.

8. The question answering processing method according to claim 6, wherein when evaluation points are counted for each answer candidate having the same language expression in the answer candidate evaluation point counting processing, evaluation points of answer candidates having the same language expression are sorted and ranked in descending ranking order of evaluation, and a formula 2;

$$\text{Score}=\Sigma k^{i-1}*\text{Point}_i \qquad (2)$$

where $\Sigma$ is the sum total when i takes a value of 1 to n; n is the number of answer candidates having the same language expression; and Point ($1 \leq i \leq n$) is the ranking order of evaluation points of the answer candidates; which is calculated whereto obtain each sum total of the values of the answer candidates as the representative evaluation point of answer candidate having the same language expression.

* * * * *

UNITED STATES PATENT AND TRADEMARK OFFICE
CERTIFICATE OF CORRECTION

PATENT NO. : 7,444,279 B2  Page 1 of 1
APPLICATION NO. : 10/859293
DATED : October 28, 2008
INVENTOR(S) : Masaki Murata It is certified that error appears in the above-identified patent and that said Letters Patent is hereby corrected as shown below:

Title Page, under item (56) Column 2 (Other Publications), Line 17, change "Infiormatics," to --Informatics,--.

Column 16, Line 63, change "ranking," to --ranking--.

Column 16, Line 65, change "order" to --order,--.

Signed and Sealed this

Sixth Day of January, 2009

JON W. DUDAS
*Director of the United States Patent and Trademark Office*